United States Patent
Nishi

(10) Patent No.: US 11,836,941 B2
(45) Date of Patent: Dec. 5, 2023

(54) PACKAGE MEASURING APPARATUS, PACKAGE ACCEPTING SYSTEM, PACKAGE MEASURING METHOD, AND NON-TRANSITORY COMPUTER READABLE MEDIUM

(71) Applicant: NEC Platforms, Ltd., Kawasaki (JP)

(72) Inventor: Youhei Nishi, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 453 days.

(21) Appl. No.: 17/274,266

(22) PCT Filed: Apr. 18, 2019

(86) PCT No.: PCT/JP2019/016702
§ 371 (c)(1),
(2) Date: Mar. 8, 2021

(87) PCT Pub. No.: WO2020/054118
PCT Pub. Date: Mar. 19, 2020

(65) Prior Publication Data
US 2021/0350561 A1    Nov. 11, 2021

(30) Foreign Application Priority Data

Sep. 10, 2018  (JP) .................................. 2018-168783

(51) Int. Cl.
*G06K 9/00*       (2022.01)
*G06T 7/60*       (2017.01)
(Continued)

(52) U.S. Cl.
CPC .......... *G06T 7/60* (2013.01); *G06Q 10/08345* (2013.01); *G06Q 20/085* (2013.01); *G06T 7/543* (2017.01); *G06T 2207/10028* (2013.01)

(58) Field of Classification Search
CPC . G06T 7/60; G06T 7/543; G06T 2207/10028; G06T 7/62; G06Q 10/08345;
(Continued)

(56) References Cited

U.S. PATENT DOCUMENTS 4,694,404 A * 9/1987 Meagher ................. G06T 15/06
345/423
6,549,200 B1 * 4/2003 Mortlock ................ G06T 15/04
345/419

(Continued)

FOREIGN PATENT DOCUMENTS

JP      2010-008352 A     1/2010
JP      2013-239015 A    11/2013
(Continued)

OTHER PUBLICATIONS

International Search Report for PCT Application No. PCT/JP2019/016702, dated Jun. 18, 2019.
(Continued)

*Primary Examiner* — Shervin K Nakhjavan
(74) *Attorney, Agent, or Firm* — Sughrue Mion, PLLC

(57) ABSTRACT

A package measuring apparatus includes a depth sensor, the package having a rectangular parallelepiped shape and placed on a mounting table, and at least one processor. The processor obtains spatial coordinates of four vertices within a space in which the center of the depth sensor is set as the point of origin based on data of a distance from the depth sensor to each of the four vertices and data of a position of each sensor element of the depth sensor corresponding to each of the four vertices. The processor calculates, based on the spatial coordinates of the four vertices, a length of each of three sides defined between a first vertex and three other vertices.

9 Claims, 13 Drawing Sheets

(51) Int. Cl.
*G06T 7/543* (2017.01)
*G06Q 10/0834* (2023.01)
*G06Q 20/08* (2012.01)

(58) Field of Classification Search
CPC .... G06Q 20/085; G06Q 20/18; G06Q 20/208; G06Q 50/28; G01B 11/00; G01B 11/02
See application file for complete search history.

(56) References Cited

U.S. PATENT DOCUMENTS

| | | | | |
|---|---|---|---|---|
| 9,607,406 | B2* | 3/2017 | Hata | G06T 7/75 |
| 9,744,669 | B2* | 8/2017 | Wicks | G06V 20/10 |
| 10,697,757 | B2* | 6/2020 | Krishnamurthy | G01B 11/22 |
| 11,488,336 | B1* | 11/2022 | Baron | G06T 11/60 |
| 2013/0300740 | A1* | 11/2013 | Snyder | G06T 17/00 |
| | | | | 345/419 |
| 2014/0021259 | A1* | 1/2014 | Moed | G06K 7/1417 |
| | | | | 356/625 |
| 2014/0229143 | A1* | 8/2014 | Cohen-Or | G06T 17/10 |
| | | | | 703/1 |
| 2015/0248578 | A1* | 9/2015 | Utsumi | H04N 23/17 |
| | | | | 382/154 |
| 2017/0336195 | A1 | 11/2017 | Suzuki et al. | |
| 2022/0392095 | A1* | 12/2022 | Nishi | G06T 7/194 |

FOREIGN PATENT DOCUMENTS

| | | |
|---|---|---|
| JP | 2015-194424 A | 11/2015 |
| JP | 2019-020307 A | 2/2019 |
| WO | 2016/199366 A1 | 12/2016 |

OTHER PUBLICATIONS

Japanese Office Action for JP Application No. 2018-168783 dated Dec. 17, 2019 with English Translation.

* cited by examiner

PACKAGE MEASURING APPARATUS, PACKAGE ACCEPTING SYSTEM, PACKAGE MEASURING METHOD, AND NON-TRANSITORY COMPUTER READABLE MEDIUM

This application is a National Stage Entry of PCT/JP2019/016702 filed on Apr. 18, 2019, which claims priority from Japanese Patent Application 2018-168783 filed on Sep. 10, 2018, the contents of all of which are incorporated herein by reference, in their entirety.

TECHNICAL FIELD

The present disclosure relates to a package measuring apparatus, a package accepting system, a package measuring method, and a program.

BACKGROUND ART

Convenience stores and the like offer a service of accepting a shipping order for a package dropped off thereat as one of their services. When a package is dropped off at a store, the size of the package is measured at the store in accordance with the standard criteria for acceptance of the shipping order set by each shipping carrier and the shipping charge is calculated at the store in accordance with the rate of each shipping carrier. More specifically, a store clerk receives an object to be shipped from a customer and measures the size of the object to be shipped. Then, the store clerk enters information items such as the shipping carrier, the type of shipment, and the shipping destination acquired from a sheet on which the information items are filled-in, into a POS (Point of sale) terminal, calculates the shipping charge, and performs the checkout processing for the calculated shipping charge.

Measuring the size of the package is burdensome and time-consuming for the store clerk. To solve this problem, Patent Literature 1 discloses a technique of measuring the size of a package by picking-up an image of the package.

CITATION LIST

Patent Literature

Patent Literature 1: Japanese Unexamined Patent Application Publication No. 2015-194424

SUMMARY OF INVENTION

Technical Problem

However, with the technique disclosed in Patent Literature 1, it is necessary to affix, beforehand, a reference label whose size is known to a package having a rectangular parallelepiped shape.

An object of the present disclosure is to provide a package measuring apparatus, a package accepting system, a package measuring method, and a program capable of measuring a size of a package even if a reference label whose size is known is not affixed to the package beforehand.

Solution to Problem

A package measuring apparatus according to a first example aspect includes:

a depth sensor disposed at a position at which the depth sensor is able to pick-up an image of a package for three faces thereof simultaneously and configured to acquire a distance to the package by picking-up the image of the package, the package having a rectangular parallelepiped shape and placed on a mounting table; and a control unit configured to calculate a size of the package based on data acquired from the depth sensor, in which the control unit performs the processing of:

picking-up an image of the mounting table on which nothing is placed using the depth sensor beforehand and storing the picked-up image as background depth image data;

controlling the depth sensor, acquiring depth image data of the package by picking-up the image of the package placed on the mounting table for the three faces thereof simultaneously using the depth sensor, and specifying data of the package in the depth image data of the package by comparing the depth image data of the package with the background depth image data;

specifying positions of a first vertex, a second vertex, a third vertex, and a fourth vertex, the first vertex being a vertex which is common among the three faces of the package and is at a position closest in distance from the depth sensor within the depth image data of the package, the second vertex being a vertex which is at a position on the leftmost side within the depth image data of the package, the third vertex being a vertex which is at a position on the rightmost side within the depth image data of the package, and the fourth vertex being a vertex which is at a position on the lowermost side within the depth image data of the package;

obtaining spatial coordinates of the first vertex, the second vertex, the third vertex, and the fourth vertex within a space in which the center of the depth sensor is set as the point of origin based on data of a distance from the depth sensor to each of the first vertex, the second vertex, the third vertex, and the fourth vertex and data of a position of each sensor element of the depth sensor corresponding to each of the first vertex, the second vertex, the third vertex, and the fourth vertex; and calculating, based on the spatial coordinates of the first vertex, the second vertex, the third vertex, and the fourth vertex, a length of a first side defined between the first vertex and the second vertex, a length of a second side defined between the first vertex and the third vertex, and a length of a third side defined between the first vertex and the fourth vertex.

A package measuring method according to a second example aspect is a package measuring method for calculating a size of a package using a depth sensor disposed at a position at which the depth sensor is able to pick-up an image of a package for three faces thereof simultaneously and configured to acquire a distance to the package by picking-up the image of the package, the package having a rectangular parallelepiped shape and placed on a mounting table, the method including:

picking-up an image of the mounting table on which nothing is placed using the depth sensor beforehand and storing the picked-up image as background depth image data;

controlling the depth sensor, acquiring depth image data of the package by picking-up the image of the package placed on the mounting table for the three faces thereof simultaneously using the depth sensor, and specifying data of the package in the depth image data of the package by comparing the depth image data of the package with the background depth image data;

specifying positions of a first vertex, a second vertex, a third vertex, and a fourth vertex, the first vertex being a vertex which is common among the three faces of the package and is at a position closest in distance from the depth sensor within the depth image data of the package, the second vertex being a vertex which is at a position on the leftmost side within the depth image data of the package, the third vertex being a vertex which is at a position on the rightmost side within the depth image data of the package, and the fourth vertex being a vertex which is at a position on the lowermost side within the depth image data of the package;

obtaining spatial coordinates of the first vertex, the second vertex, the third vertex, and the fourth vertex within a space in which the center of the depth sensor is set as the point of origin based on data of a distance from the depth sensor to each of the first vertex, the second vertex, the third vertex, and the fourth vertex and data of a position of each sensor element of the depth sensor corresponding to each of the first vertex, the second vertex, the third vertex, and the fourth vertex; and calculating, based on the spatial coordinates of the first vertex, the second vertex, the third vertex, and the fourth vertex, a length of a first side defined between the first vertex and the second vertex, a length of a second side defined between the first vertex and the third vertex, and a length of a third side defined between the first vertex and the fourth vertex.

A program according to a third example aspect is a program for causing a computer to perform calculation processing of calculating a size of a package using a depth sensor disposed at a position at which the depth sensor is able to pick-up an image of a package for three faces thereof simultaneously and configured to acquire a distance to the package by picking-up the image of the package, the package having a rectangular parallelepiped shape and placed on a mounting table, the calculation processing including:

picking-up an image of the mounting table on which nothing is placed using the depth sensor beforehand and storing the picked-up image as background depth image data;

controlling the depth sensor, acquiring depth image data of the package by picking-up the image of the package placed on the mounting table for the three faces thereof simultaneously using the depth sensor, and specifying data of the package in the depth image data of the package by comparing the depth image data of the package with the background depth image data;

specifying positions of a first vertex, a second vertex, a third vertex, and a fourth vertex, the first vertex being a vertex which is common among the three faces of the package and is at a position closest in distance from the depth sensor within the depth image data of the package, the second vertex being a vertex which is at a position on the leftmost side within the depth image data of the package, the third vertex being a vertex which is at a position on the rightmost side within the depth image data of the package, and the fourth vertex being a vertex which is at a position on the lowermost side within the depth image data of the package;

obtaining spatial coordinates of the first vertex, the second vertex, the third vertex, and the fourth vertex within a space in which the center of the depth sensor is set as the point of origin based on data of a distance from the depth sensor to each of the first vertex, the second vertex, the third vertex, and the fourth vertex and data of a position of each sensor element of the depth sensor corresponding to each of the first vertex, the second vertex, the third vertex, and the fourth vertex; and calculating, based on the spatial coordinates of the first vertex, the second vertex, the third vertex, and the fourth vertex, a length of a first side defined between the first vertex and the second vertex, a length of a second side defined between the first vertex and the third vertex, and a length of a third side defined between the first vertex and the fourth vertex.

Advantageous Effects of Invention

According to the present disclosure, a package measuring apparatus, a package accepting system, a package measuring method, and a program capable of a size of a package even if a reference label whose size is known is not affixed to the package beforehand can be provided.

DESCRIPTION OF EMBODIMENTS

Hereinbelow, example embodiments will be described with reference to the drawings. Note that in the example embodiments, the identical reference symbols denote identical or equivalent structural elements and redundant explanations thereof are omitted.

First Example Embodiment

Figure 1:
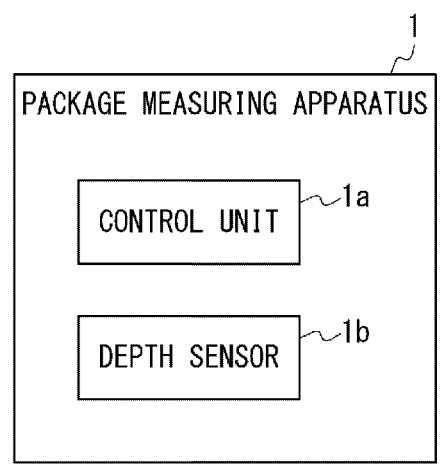
FIG. 1 is a functional block diagram showing an example of a configuration of a package measuring apparatus according to a first example embodiment.

FIG. 1 is a functional block diagram showing an example of a configuration of a package measuring apparatus according to a first example embodiment.

As shown in FIG. 1, the package measuring apparatus 1 according to the present example embodiment includes a control unit 1a and a depth sensor 1b. The package measuring apparatus 1 is configured to be able to calculate (measure) the size of the package using the depth sensor 1b based on the data acquired using the depth sensor 1b. This calculation may be performed by the control unit 1a.

The depth sensor 1b is disposed at a position at which it can pick-up (detect) an image of a package for three faces thereof simultaneously, the package having a rectangular parallelepiped shape and placed on a mounting table. The depth sensor 1b picks-up (detects) the image of the package placed on the mounting table to thereby acquire a distance from the package. The depth sensor 1b may employ a TOF (Time Of Flight) method, or other measuring methods such as a pattern irradiation method may be employed for the depth sensor 1b. Further, an infrared light or the like may be used in performing the measurement, however it is not limited thereto.

Further, although not shown in FIG. 1, the package measuring apparatus 1 according to the present example embodiment may include the aforementioned mounting table. In this case, the depth sensor 1b may be attached to this mounting table. It is needless to mention that the depth sensor 1b is attached to the mounting table so that an image capturing unit such as a lens is brought to a position where it can simultaneously pick-up an image of the package for the three faces thereof. The mounting table is a table on which a package having a rectangular parallelepiped shape whose image is to be picked-up using the depth sensor 1b is placed, and there is no limitation on the shape of the mounting table other than that it basically has a planar mounting surface.

The control unit 1a calculates the size of the package based on the data of the package acquired from the depth sensor 1b. For instance, the control unit 1a may be implemented by an integrated circuit (IC: Integrated Circuit). Further, the control unit 1a may be implemented by, for example, a CPU (Central Processing Unit), a work memory, and a non-volatile storage device storing a program.

A specific size calculation processing performed by the control unit 1a will be described.

The control unit 1a picks-up an image of the mounting table on which nothing is placed using the depth sensor 1b beforehand and stores the picked-up image as background depth image data. The control unit 1a may include a storage device for storing the background depth image data. Note that the storage device for storing the background depth image data and the aforementioned storage device for storing a program may be the same storage device.

Further, the control unit 1a controls the depth sensor 1b so that the depth sensor 1b picks-up an image of the package placed on the mounting table for the three faces thereof simultaneously to thereby acquire the depth image data of the package placed on the mounting table. Then, the control unit 1a compares the depth image data of the package placed on the mounting table with the background depth image data whereby the data of the package (part of data corresponding to the package) in the depth image data of the package placed on the mounting table is specified.

Further, the control unit 1a specifies the position of first to fourth vertices described below. The first vertex is a vertex which is common among the aforementioned three faces of the package and is at a position closest in distance from the depth sensor 1b within the depth image data of the package placed on the mounting table. The second vertex is a vertex which is at a position on the leftmost side within the depth image data of the package placed on the mounting table. The third vertex is a vertex which is at a position on the rightmost side within the depth image data of the package placed on the mounting table. The fourth vertex is a vertex which is at a position on the lowermost side within the depth image data of the package placed on the mounting table.

The control unit 1a obtains the spatial coordinates of the first vertex within the space in which the center of the depth sensor 1b is set as the point of origin based on the data of the distance from the depth sensor 1b to the first vertex and the data of the position of a sensor element of the depth sensor 1b corresponding to the first vertex. Like in the case of the first vertex, the control unit 1a obtains the spatial coordinates of the second to the fourth vertices within the space in which the center of the depth sensor 1b is set as the point of origin based on the data of the distance from the depth sensor 1b to each of the second to the fourth vertices and the data of the position of each sensor element of the depth sensor 1b corresponding to each of the second to the fourth vertices.

Then, the control unit 1a calculates the lengths of a first side, a second side, and a third side of the package based on the spatial coordinates of the first vertex, the second vertex, the third vertex, and the fourth vertex, and outputs the result of the calculation. Here, the first side refers to a side defined between the first vertex and the second vertex, the second side refers to a side defined between the first vertex and the third vertex, and the third side refers to a side defined between the first vertex and the fourth vertex. Note that the result of the calculation may be displayed on a display unit provided further or may be printed out using a printer that is connected further. Like in this example, the result of the calculation may be output in any way.

In the package measuring apparatus 1 according to the present example embodiment, since the lengths of the three sides of the package having a rectangular parallelepiped shape can be calculated using the depth sensor 1b, it is possible to measure the size of the package even if a reference label whose size is known is not affixed to the package beforehand.

Second Example Embodiment

Figure 2:
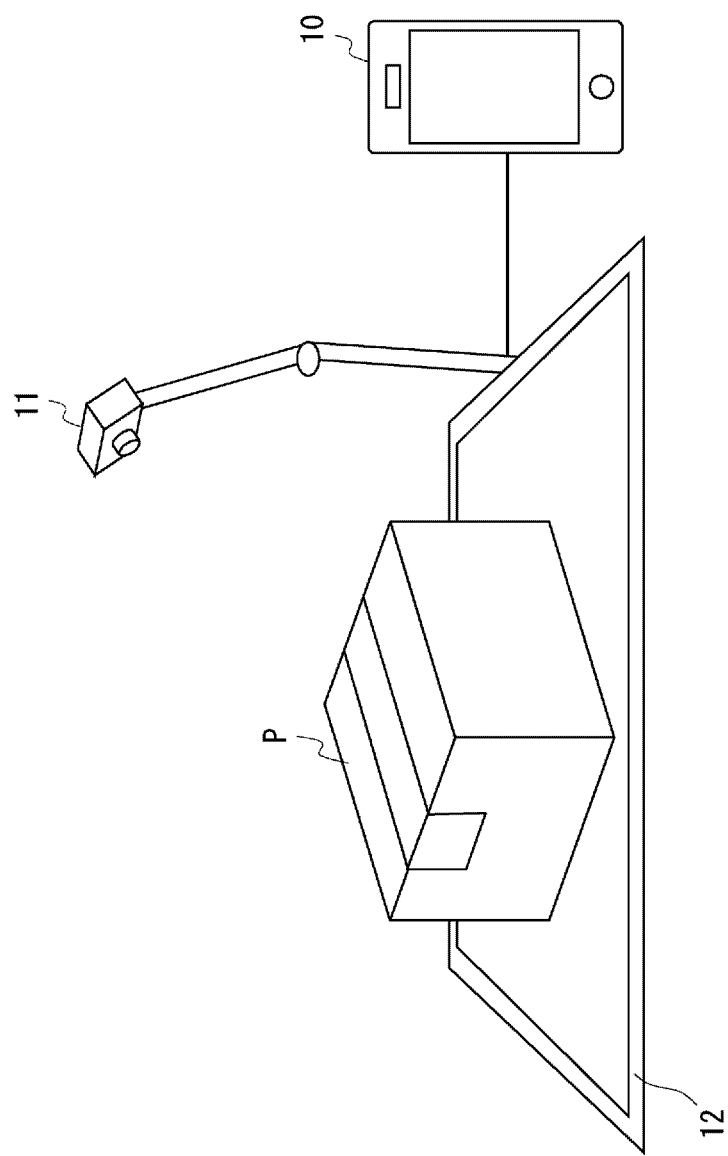
FIG. 2 is a schematic diagram showing an example of a configuration of a package measuring apparatus according to a second example embodiment.
Figure 3:
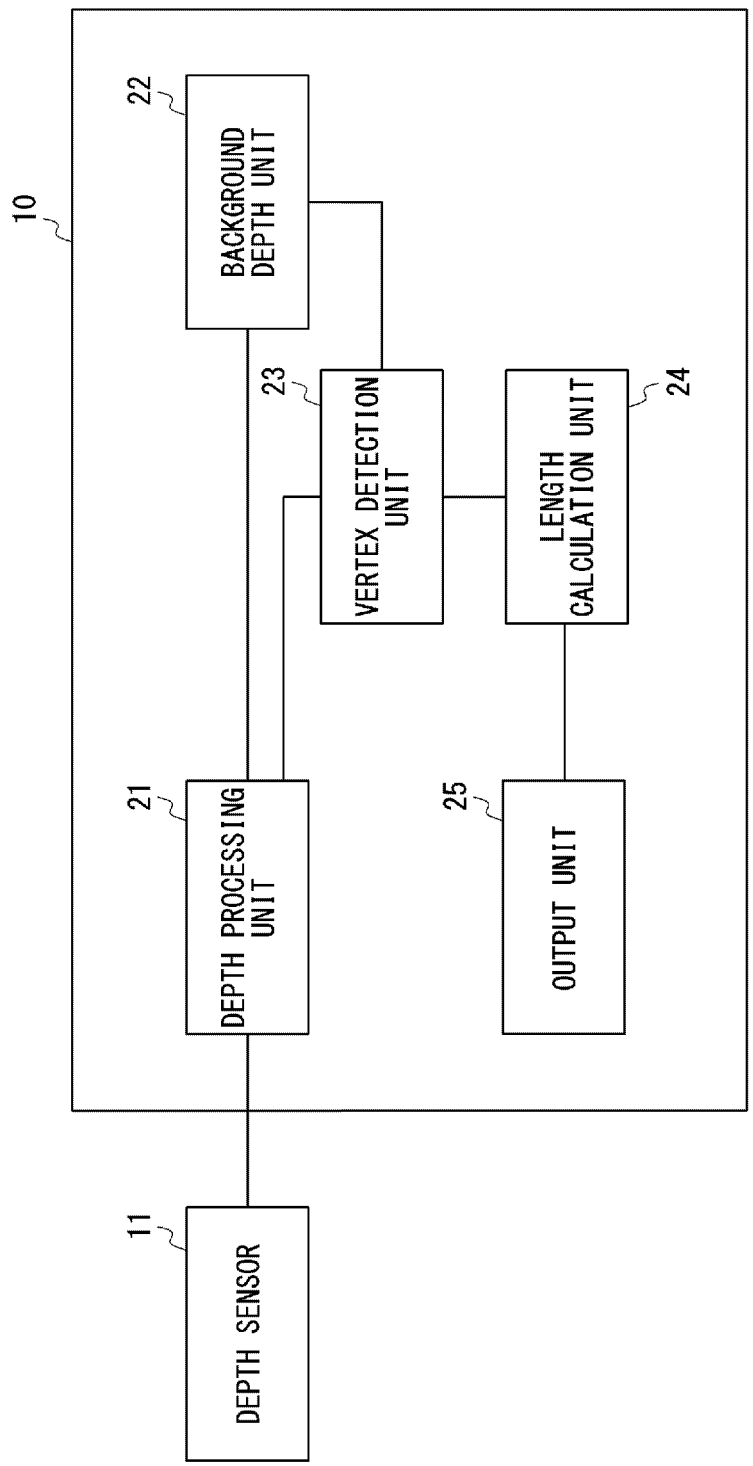
FIG. 3 is a functional block diagram showing the package measuring apparatus shown in FIG. 2.

A second example embodiment will be described with reference to FIGS. 2 to 10, the description being mainly on the difference from the first example embodiment. However, various examples described in the first example embodiment can be applied. FIG. 2 is a schematic diagram showing an example of a configuration of a package measuring apparatus according to the second example embodiment, and FIG. 3 is a functional block diagram showing the package measuring apparatus shown in FIG. 2.

As shown in FIG. 2, the package measuring apparatus according to the present example embodiment may include a tablet terminal 10 including the control unit 1a, a depth sensor 11 as an example of the depth sensor 1b, and a mounting table (a loading table) 12 to which the depth sensor 11 is attached.

The tablet terminal 10 is connected to the depth sensor 11 in a wired or wireless manner and can perform communication with the depth sensor 11. The tablet terminal 10 may include a communication interface or the like for establishing the connection described above. Note that the tablet terminal 10 may be a terminal referred to as a mobile PC (Personal Computer) or may be a device such as an installation type PC, a mobile phone (including those referred to as smartphones), or the like.

The package measuring apparatus shown in FIG. 2 is, for instance, an apparatus for measuring, using the depth sensor 11, the size of the package P to be shipped, and may be installed at a corner of the store in order to reduce the burden of the store clerk who is working at the store where the package is accepted. The package may be a parcel for home delivery. Further, the store where the package is accepted is not limited to a drop-off point for the parcel for home delivery managed by a courier and may be a convenience store or the like which has contracted to provide the service of accepting the parcel for home delivery.

For instance, the customer places a package P for which he/she is requesting shipment on the mounting table 12, confirms the size of the package P displayed on the tablet terminal 10 that belongs to the customer, performs the payment processing for the calculated shipping charge using the POS terminal installed within the store, and passes the package P onto the store clerk. In this way, the store can engage in the service of accepting the parcel for home delivery. At this time, the customer has the aforementioned program (an application software) installed on his/her tablet terminal 10. Then, under a state in which the software is activated and the package P is placed on the mounting table 12, the customer can start measurement of the package P by, for instance, pressing down a software key for starting measurement mounted on the software. Further, the customer can enter the address and the name of the recipient of the package through the software prior to performing the payment processing for the shipping charge, whereby the customer can perform the payment processing for the shipping charge corresponding to the shipping distance. Note that as regards the payment processing, it is possible to perform the payment processing through an electronic payment system using the tablet 10 that belongs to the customer.

It is needless to mention that the service of accepting the parcel for home delivery may be provided by confirming, at the store using the store's tablet terminal 10, the size of the package P placed on the mounting table by the customer or the store clerk.

Next, the measurement of the package according to the present example embodiment will be described.

The depth sensor 11 may be a device with which the distance information within the image pick-up range can be acquired for every pixel (that is, for every sensor element). The depth sensor 11 acquires the distance from a plane with the depth sensor 11 set as the point of origin to the object to be shipped. The plane with the depth sensor set as the point of origin is a plane that is orthogonal to the camera axis (the sensor axis), which is a direction in which the depth sensor picks-up an image.

As shown in FIG. 2, the depth sensor 11 is disposed in a slanted manner so that an image of the package (the rectangular parallelepiped object) P placed on the mounting table 12 can be picked-up for the three faces thereof (see, FIG. 5), and the distance from the depth sensor 11 to each vertex of the package P is acquired. Note that the sensor is configured on the assumption that the package P has a rectangular parallelepiped shape, and if the package P has a shape other than the parallelepiped shape, the sensor may output an error.

The tablet terminal 10 may include, as functional units corresponding to the control unit 1*a*, a depth processing unit 21, a background depth unit 22, a vertex detection unit 23, a length calculation unit (a measuring unit or a computing unit) 24, and an output unit 25 such as a screen output unit. These functional units 21 to 25 may be implemented by causing the CPU of the control unit 1*a* to execute the aforementioned software.

The depth processing unit 21 acquires data from the depth sensor 11 and stores the acquired data. The background depth unit 22 stores data acquired by picking-up an image of the mounting table 12 on which nothing is placed in advance. The vertex detection unit 23 determines the data of the package and the positions of the first to the fourth vertices. This means that the vertex detection unit 23 compares the depth information stored in the background depth unit 22 with the depth information indicating the state in which the package is present, extracts the part of the data that has changed, and detects the vertex information (the information indicating the first to the fourth vertices) from the extracted data.

The length calculation unit 24 calculates the distance between the vertices (that is, the length of each of the first to the third sides) from the information detected by the vertex detection unit 23 and passes the result of the calculation onto the output unit 25. The output unit 25 outputs the result of the calculation performed by the length calculation unit 24 (i.e., the measurement result of the package) to the outside unit as well as the information related to the operations. The output unit 25 may be, for instance, a display unit of the tablet terminal 10. Note that the output unit 25 may be a communication interface for outputting the result of the measurement to, for instance, a printer for printing a shipment label to be affixed to the package P.

Figure 4:
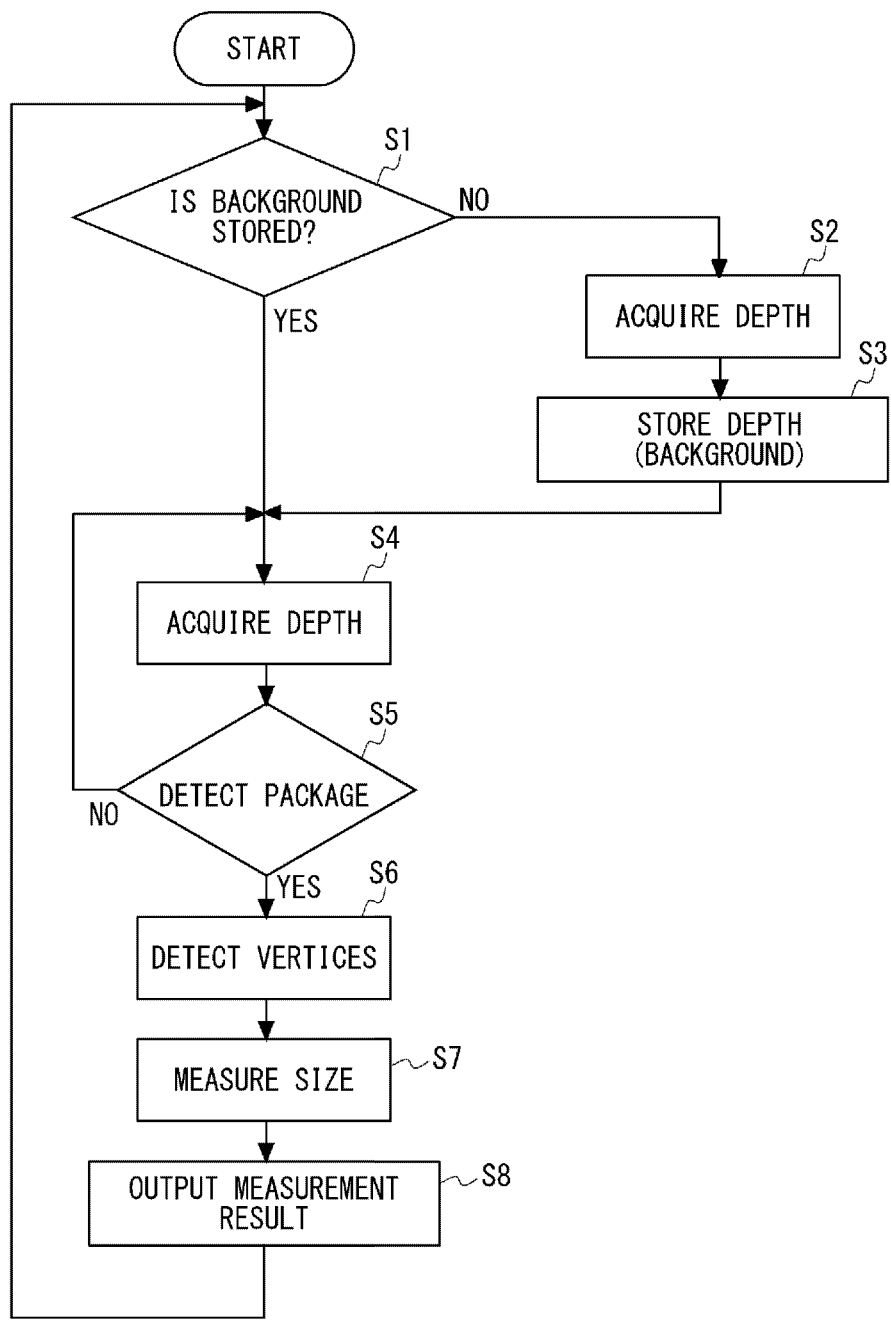
FIG. 4 is a flowchart for explaining an example of a package measurement processing implemented by the package measuring apparatus shown in FIG. 2.
Figure 5:
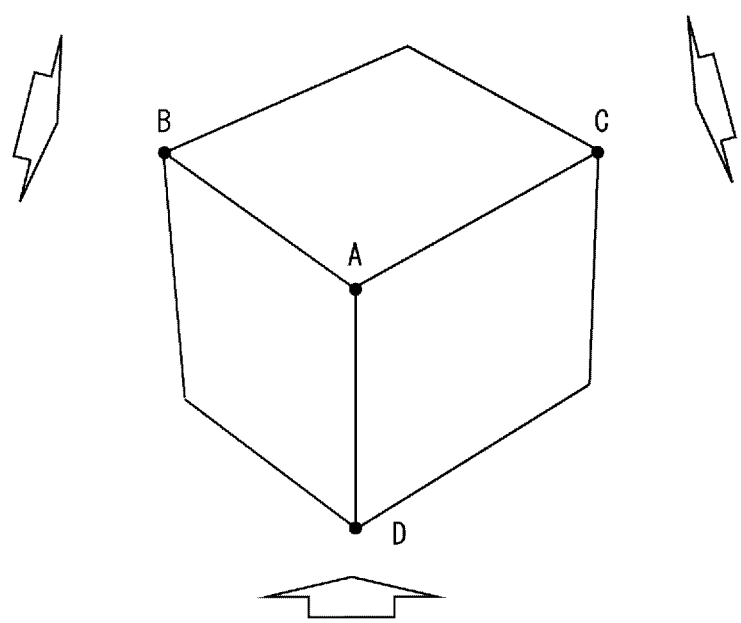
FIG. 5 is a schematic diagram for explaining an example of a vertex detection processing performed in the package measurement processing described in FIG. 4.
Figure 6:
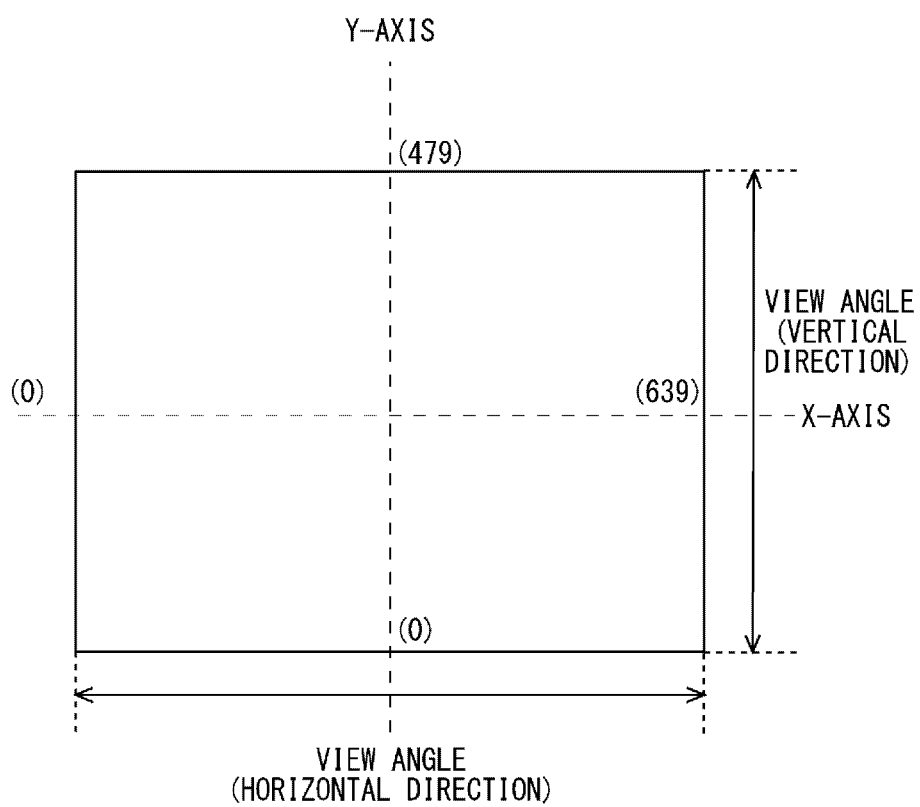
FIG. 6 is a diagram showing an example of a coordinate system used in the vertex detection processing performed in the package measurement processing described in FIG. 4.

Next, an operation example of the package measuring apparatus according to the present example embodiment will be described with reference to FIGS. 4 to 10. FIG. 4 is a flowchart for explaining an example of a package measurement processing implemented by the package measuring apparatus shown in FIG. 2. FIG. 5 is a schematic diagram for explaining an example of a vertex detection processing performed in the package measurement processing described in FIG. 4. FIG. 6 is a diagram showing an example of a coordinate system used in the vertex detection processing performed in the package measurement processing described in FIG. 4. FIGS. 7 to 10 are schematic diagrams for explaining an example of the vertex detection processing performed in the package measurement processing described in FIG. 4 based on the visual field of the depth sensor.

First, it is confirmed whether or not the background data (the background depth image data) is stored beforehand since the vertex detection unit 23 uses the change in the depth (the distance to the object to be shipped) in detecting the object to be shipped (the package P) (Step S1). When it is NO in Step S1, that is, when the background depth image data is not stored beforehand, the vertex detection unit 23 controls the depth sensor 11, acquires the background depth data from the background depth unit 22 (Step S2), and stores the acquired background depth image data (Step S3). Note that herein, an explanation is given in which, as an example, the trigger of the starting of the measurement of the package P is the change in the depth, however, the trigger may instead be, for instance, the operations performed by the customer (or the store clerk).

The vertex detection unit 23 acquires the depth data from the depth sensor 11 (Step S4). The vertex detection unit 23 determines whether or not the package P has been placed on the mounting table 12 (whether or not the package P has been detected or not) by determining whether or not there is a change in the depth indicated in the acquired data from the depth indicated in the background depth image data (Step S5).

When there is a change in the depth, the vertex detection unit 23 determines that the package P has been placed on the mounting table 12 and extracts the points where the depth has changed from the background depth data acquired by the depth sensor 11. The points where the depth has changed are the points where the package P is present. Then, the vertex detection unit 23 detects the vertices of the package (the object to be shipped) P from among the points where the depth has changed (Step S6). In Step S6, first, based on the depth image data related to the package P extracted on the basis of the change in the depth acquired by the depth sensor 11, the four vertices A, B, C, and D shown in FIG. 5 can be determined. The vertices A, B, C, and D indicate the first vertex, the second vertex, the third vertex, and the fourth vertex, respectively.

Further, the four vertices A, B, C, and D may be detected by capturing an image of the package P with a camera (capturing an image within a region that is the same as the image pick-up region of the depth sensor 11) and acquiring an image, and then performing image recognition of the acquired image. As regards the camera, the depth sensor 11 equipped with a camera (also referred to as a depth camera) may be employed or a camera provided separately from the depth sensor 11 may be employed. As described above, the package measuring apparatus according to the present example embodiment further includes an image capturing apparatus such as a camera, and the vertex detection unit 23 may be configured to detect the first to the fourth vertices by performing the image recognition of the image captured using the image capturing apparatus. Note that by overlapping the region of the package in the depth image taken using the depth sensor 11 and the region of the package in the image taken using the camera over each other, it is possible to know which points in the depth image taken using the depth sensor 11 correspond to the four vertices in the image taken using the camera.

Further, when the four vertices cannot be detected from the change in the depth, the vertex detection unit 23 may perform an error output as described above or may display a message prompting adjustment of the position of the package P along with an image of the package P on the display unit of the table terminal 10. An example of the message to be displayed includes a message prompting the user to move the package P or to turn the package P around so that the image of the package P can be picked-up for the three faces thereof. Note that the display unit may be an example of the output unit 25 and this kind of display control may be performed by a part of the control unit 1a shown in FIG. 1. Further, in this case, the vertex detection unit 23 and the output unit 25 are connected in FIG. 3 although this is not shown in the drawing.

As described above, the vertex detection unit 23 may be configured to capture an image of the package P placed on the mounting table 12 and to cause the display unit to display the captured image of the package P. The vertex detection unit 23 may also be configured to cause the display unit to display a message prompting adjustment of the mounting state of the package P when at least one of the vertices A to D of the package cannot be specified.

Further, it is also possible to display the image of the package P on the display unit when all of the vertices A to D are detected. That is, the package measuring apparatus according to the present example embodiment may include an image capturing apparatus such as a camera in the depth sensor 11 (or provided separately from the depth sensor 11), and may be configured so that the image of the package P captured using the image pick-up apparatus is displayed on the display unit of the tablet terminal 10.

Here, referring to FIG. 5, an example of determining the four vertices of the package P will be described. The depth sensor 11 is installed so that the image of the package P like the one shown in FIG. 5 can be acquired. As described above, the depth sensor 11 acquires the distance from the plane with the depth sensor 11 set as the point of origin to the object to be shipped. Therefore, the vertex detection unit 23 can acquire, from the depth sensor 11, the data of the actual distance as regards the certain point within the image pick-up region (the depth image) of the depth sensor 11. Further, the vertex detection unit 23 can acquire, from the depth sensor 11, the data indicating which sensor element (which pixel) the certain point within the image pick-up region (the depth image) of the depth sensor 11 corresponds to, that is, the data of the position of the certain point within the image pick-up region (the depth image) of the depth sensor.

The vertex detection unit 23 can acquire information on the position of the package P within the image pick-up region of the depth sensor by comparing the data of the distance from the depth sensor to the package P when the package P is not placed on the mounting table with the data of the distance from the depth sensor to the package P when the package P is placed on the mounting table. As a result, the vertex detection unit 23 can specify the data of the distance from the plane with the depth sensor 11 set as the point of origin to each point of the package P. Then, the vertex detection unit 23 can determine the point of the package which is the closest to the depth sensor 11 as the vertex A which is an intersection of the three faces of the package. Further, the vertex detection unit 23 can determine the point of the package P on the leftmost side to be the vertex B, the point of the package P on the rightmost side to be the vertex C, and the point of the package on the lowermost side to be the vertex D. Note that the vertices A, B, C, and D need not be determined in the aforementioned order.

Following Step S6, the length calculation unit 24 measures the size of the package P (Step S7). The measurement of the size of the package, that is, the method of calculating the actual lengths of the side AB, the side AC, and the side AD in Step S7 will be described.

As shown in FIG. 6, with the center of the depth sensor 11 set as the point of origin, the Z-axis represents the camera axis direction, the X-axis represents the direction coplanar with the Z-axis and orthogonal to the Z-axis, and the Y-axis represents the direction that is orthogonal to the X-axis and the Z-axis.

In order to calculate the actual lengths of the side AB, the side AC, and the side AD, it is necessary to specify the spatial coordinates of the points A, B, C, and D within the space defined by the X-axis, the Y-axis, and the Z-axis. The spatial coordinates of the points A, B, C, and D are $(Xa, Ya, Za)$ for the point A, $(Xb, Yb, Zb)$ for the point B, $(Xc, Yc, Zc)$ for the point C, and $(Xd, Yd, Zd)$ for the point D. As regards the coordinates Za, Zb, Zc, and Zd, they can be obtained from the data acquired by the depth sensor 11.

The method of calculating the spatial coordinates Xa, Ya of the point A will be described with reference to FIGS. 7 to 10.

Figure 7:
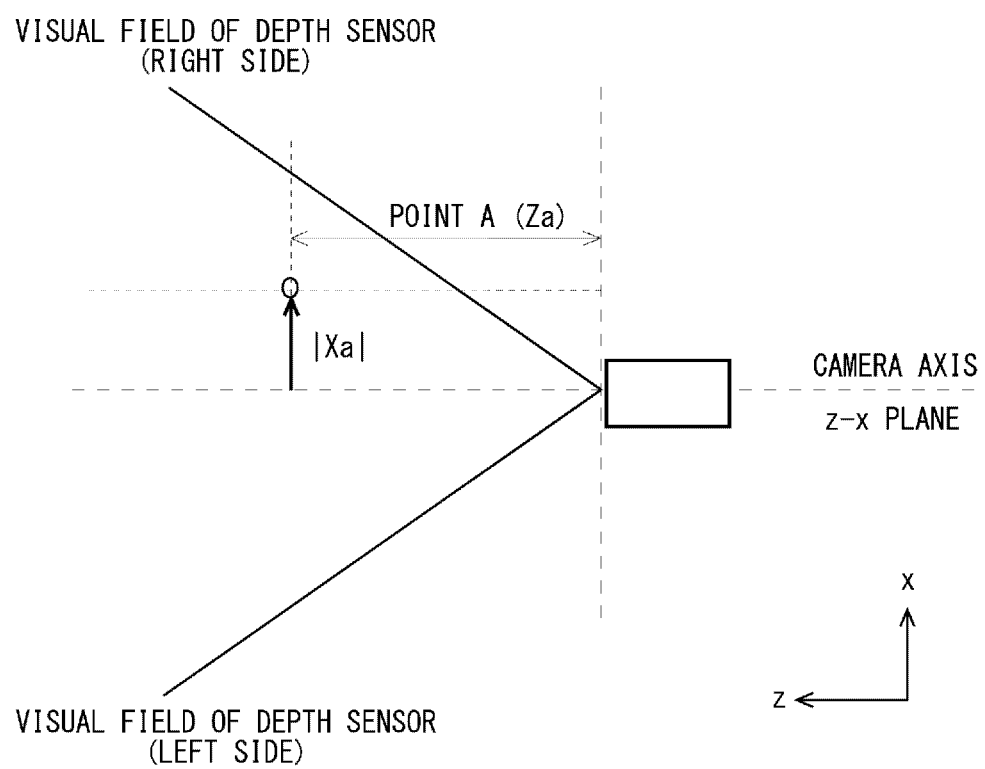
FIG. 7 is a schematic diagram for explaining an example of the vertex detection processing performed in the package measurement processing described in FIG. 4 based on a visual field of a depth sensor.
Figure 9:
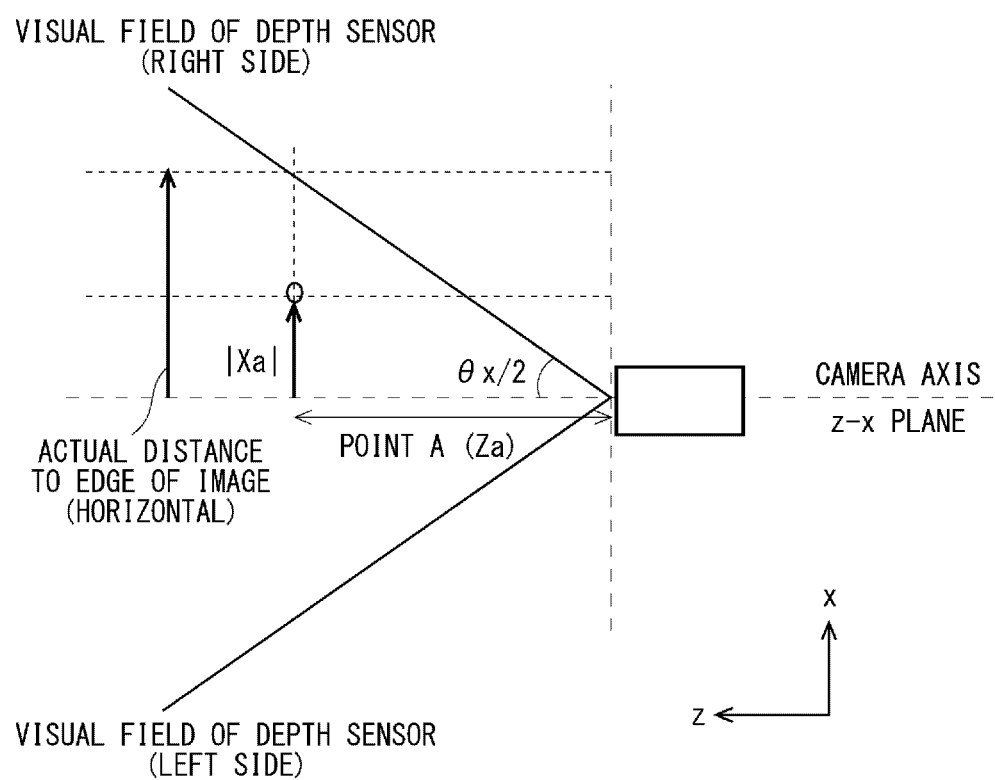
FIG. 9 is a schematic diagram for explaining an example of the vertex detection processing performed in the package measurement processing described in FIG. 4 based on a visual field of a depth sensor.

Assuming that the view angle of the depth sensor 11 in the X-axis direction is θx (degrees), the actual distance $X_{amaxp}$ to the edge of the image at the point A may be calculated from the following expression as understood from FIGS. 7 and 9.

$$X_{amaxp} = Za \times \tan(\theta x/2)$$

Figure 8:
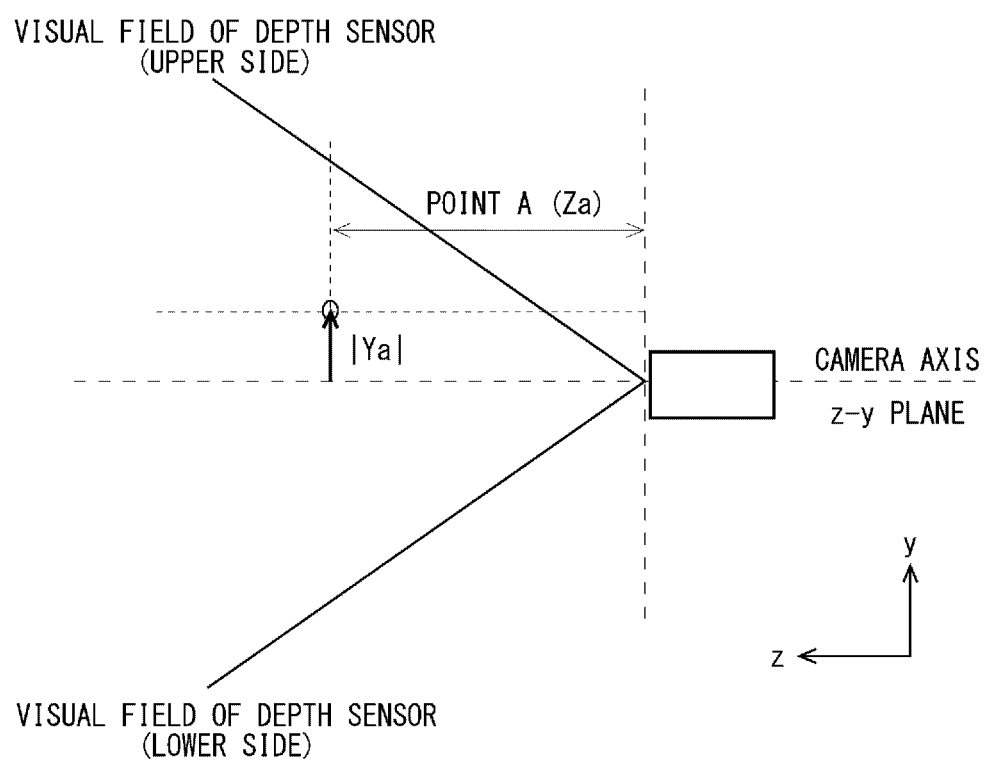
FIG. 8 is a schematic diagram for explaining an example of the vertex detection processing performed in the package measurement processing described in FIG. 4 based on a visual field of a depth sensor.
Figure 10:
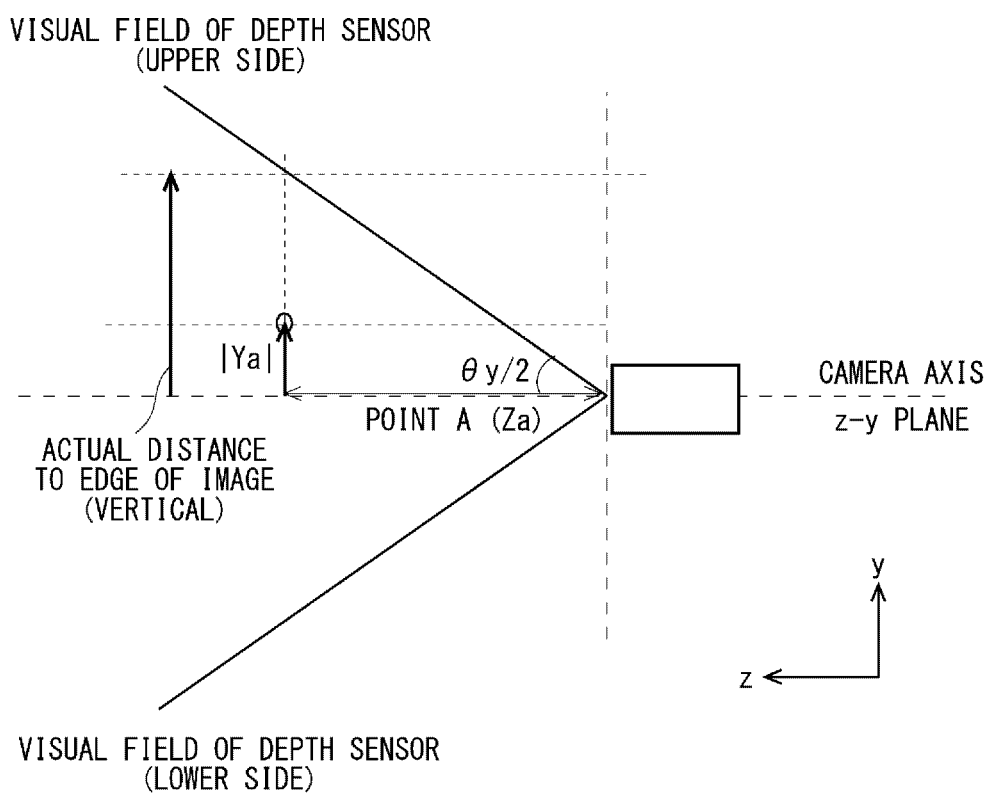
FIG. 10 is a schematic diagram for explaining an example of the vertex detection processing performed in the package measurement processing described in FIG. 4 based on a visual field of a depth sensor.

Further, assuming that the view angle of the depth sensor 11 in the Y-axis direction is θy (degrees), the actual distance $Y_{amaxp}$ to the edge of the image at the point A may be calculated from the following expression as understood from FIGS. 8 and 10.

$$Y_{amaxp} = Za \times \tan(\theta y/2)$$

Here, it is assumed that the resolution of the depth image is 640 pixels in the X-axis direction and 480 pixels in the Y-axis direction. In this case, as exemplified in FIG. 6, the pixels (the sensor elements) of No. 0 to No. 639 are arranged in the X-axis direction and the pixels (the sensor elements) of No. 0 to No. 479 are arranged in the Y-axis direction.

The distance $X_{amaxp}$ corresponds to the distance from the point of origin (the center of the image) to the 640-th pixel (No. 639) and the distance $Y_{amaxp}$ corresponds to the distance from the point of origin (the center of the image) to the 480-th pixel (No. 479).

The data of the position of the point A within the image pick-up region (the depth image) of the depth sensor 11, that is, the data as to which pixel the point A corresponds to, can be acquired from the data acquired by the depth sensor 11. Therefore, when it is assumed that the position of the pixels (the sensor elements) in the X-axis and the Y-axis at the point A is represented by (No. Xa–pixel, No. Ya–pixel), Xa and Ya may be calculated from the following expressions, respectively.

$$Xa = \Delta Xa \times ((Xa\text{-pixel}) - 640/2)$$

$$Ya = \Delta Ya \times ((Ya\text{-pixel}) - 480/2)$$

Here, ΔXa is the change rate of each pixel (the sensor element) in the X-axis direction at the point A, which can be obtained from the (Expression) $\Delta Xa = X_{amaxp}/(640/2)$. Further, ΔYa is the rate of change of each pixel (the sensor element) in the Y-axis direction at the point A, which can be obtained from the (Expression) $\Delta Ya = Y_{amaxp}/(480/2)$.

The coordinates Xb, Yb of the point B, the coordinates Xc, Yc of the point C, and the coordinates Xd, Yd of the point D may be calculated in the same way that the coordinates of the point A are calculated. Then, the length of the side AB may be calculated from the following expression.

$$\sqrt{((Xb-Xa)^2 + (Yb-Ya)^2 + (Zb-Za)^2)}$$

The side AC and the side AD may be calculated in the same way that the side AB is calculated.

Following Step S7, the output unit 25 outputs the result of the measurement of the size of the package P acquired by the length calculation unit 24 (Step S8). As described above, examples of outputting the result of the measurement include, for instance, displaying the result of the measurement on the screen of the table terminal 10 and printing out the result of the measurement using the printer which is not shown in the drawings. As another example, the output unit 25 may transmit the result of the measurement to other devices (e.g. POS terminal) which are not shown in the drawings.

According to the present example embodiment described above, the package measuring apparatus by which the effect of the first example embodiment can be achieved is installed at a store or the like, and thus the package can be measured effectively and easily at a low cost. Therefore, according to the present example embodiment, it is possible to reduce the burden of the retailer and the operation of accepting the package can be performed by the customer himself/herself. In recent years, in accordance with the growth of online shopping and the consumer-to-consumer market, there has an increase in the use of the shipping service by individual users, and thus the effect achieved by the present example embodiment described above is beneficial.

Third Example Embodiment

Figure 11:
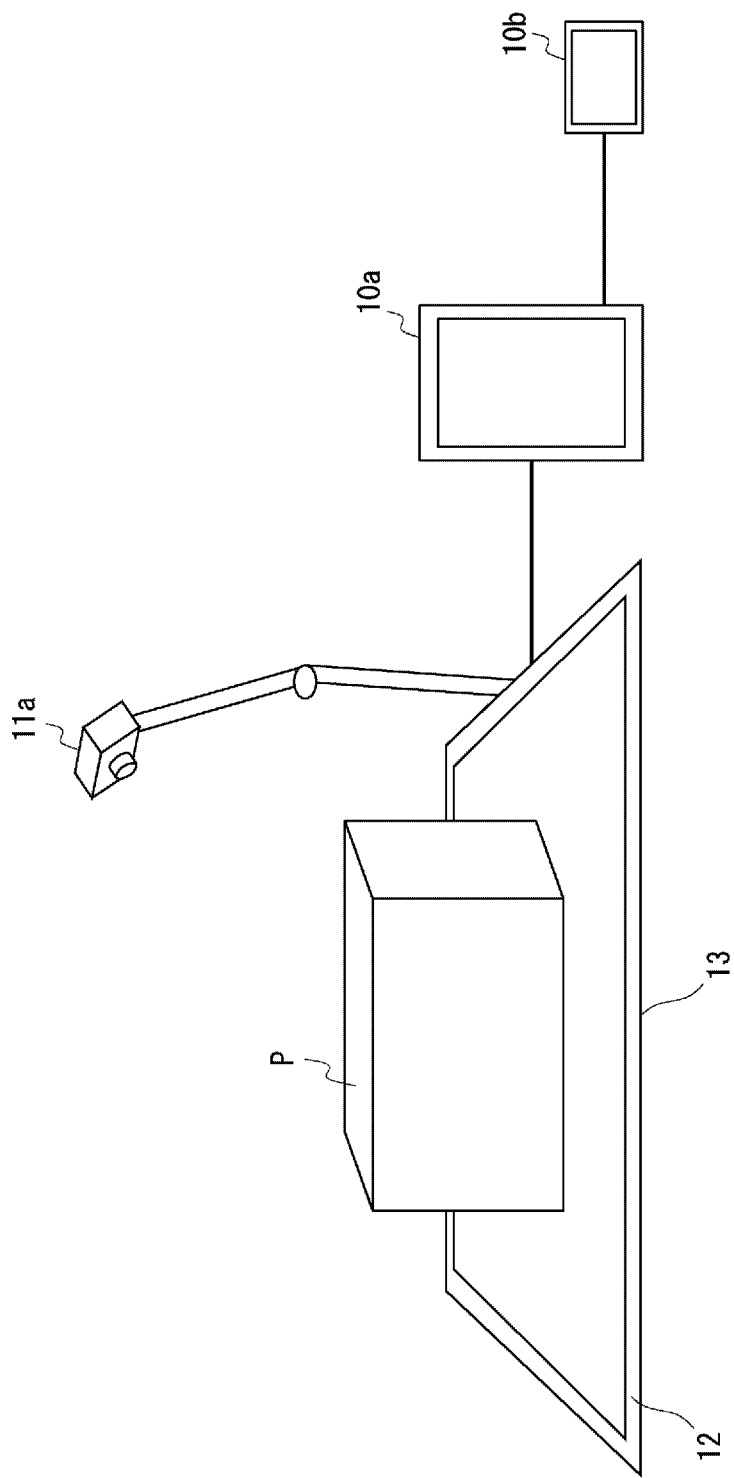
FIG. 11 is a schematic diagram showing an example of a configuration of a package measuring system that includes a package measuring apparatus according to a third example embodiment.
Figure 12:
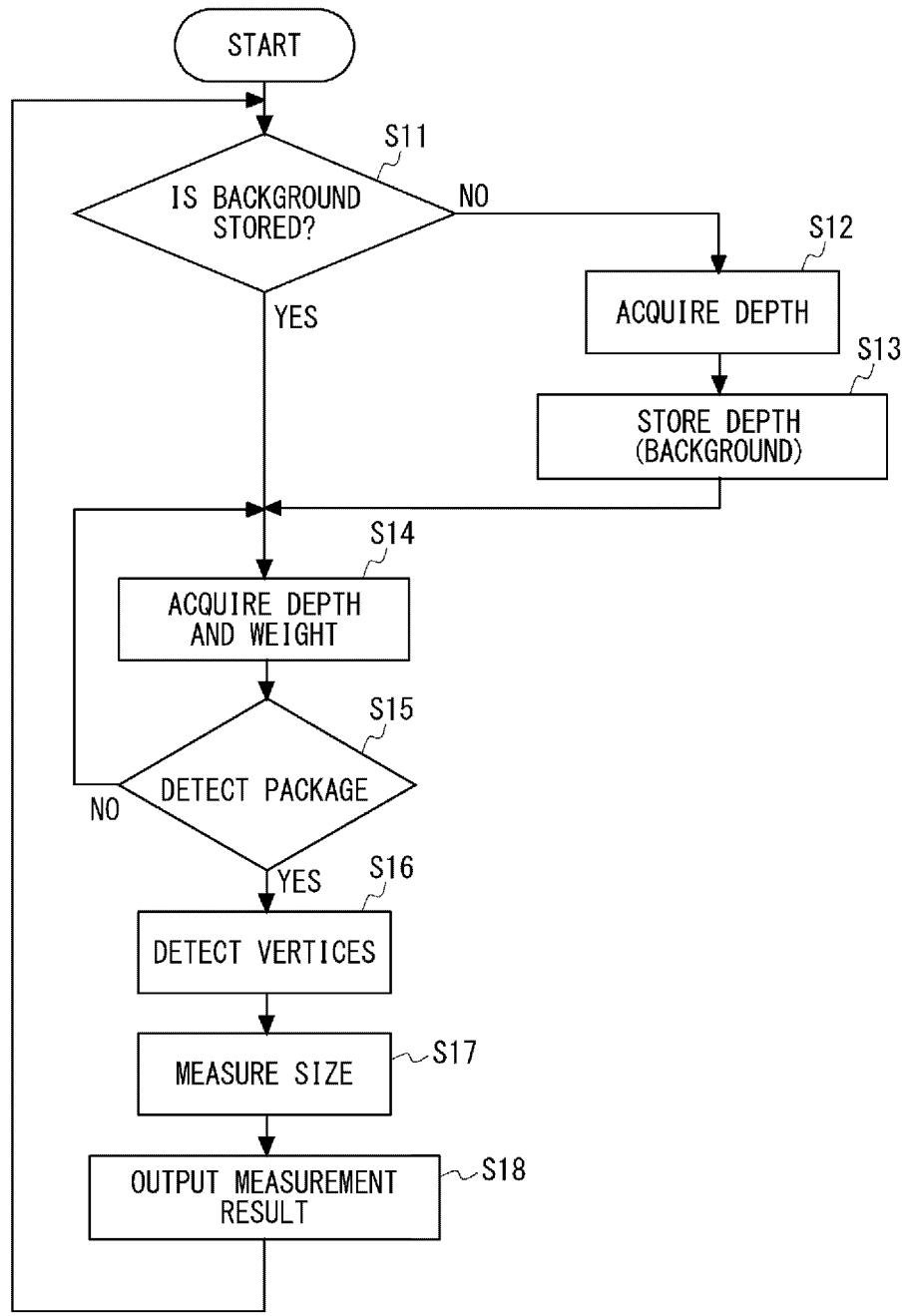
FIG. 12 is a flowchart for explaining an example of a package measurement processing implemented by the package measuring apparatus shown in FIG. 11.

A third example embodiment will be described with reference to FIGS. 11 and 12, the description being mainly on the difference from the second example embodiment including the effect thereof. However, in the third example embodiment, various examples described in the first and the second example embodiments can be applied. FIG. 11 is a schematic diagram showing an example of a configuration of a package measuring system that includes a package measuring apparatus according to the third example embodiment. FIG. 12 is a flowchart for explaining an example of a package measurement processing implemented by the package measuring apparatus shown in FIG. 11.

As shown in FIG. 11, the package reception system according to the present example embodiment is a system for accepting the package P to be shipped. The package reception system according to the present example embodiment includes the package measuring apparatus described in the second example embodiment as well as a payment processing apparatus for performing the payment processing for the shipping charge. The payment processing apparatus may be an electronic money reader/writer (R/W) 10b exemplified below, or may be other devices. The payment processing apparatus may further include a server connected to a network.

Further, the package measuring apparatus according to the present example embodiment includes a weighing scale 13 inside the mounting table 12. The weighing scale 13 measures the weight of the package P and outputs the result of the measurement to the self-checkout POS terminal 10a. Here, the self-checkout POS terminal 10a is a part of the package measuring apparatus according to the present example embodiment and is an example of a terminal provided in place of the table terminal 10.

Further, the package accepting system according to the present example embodiment may include an image capturing apparatus exemplified by the camera. Hereinbelow, an explanation of the system will be given taking the package accepting system including the camera-equipped depth sensor 11a as shown in FIG. 12 as an example. The self-checkout POS terminal 10a controls the camera of the camera-equipped depth sensor 11a so as to cause the camera to capture the image of a label (a shipment label or the like) affixed to the package P and in which the information items regarding the shipment are filled, whereby the information related to the shipment of the package P may be acquired by performing the character recognition processing or the like on the information related to the shipment of the package P.

Then, the self-checkout POS terminal 10a may calculate the shipping charge of the package P based on the size and the weight of the package P and on the information related to the shipment of the package P and may output the calculated shipping charge to the electronic money R/W 10b. Then, the payment processing for the shipping charge of the package P is performed through the electronic money R/W 10b.

As described above, the package accepting system according to the present example embodiment can measure not only the size of the package but also the weight of the package using the weighing scale 13, and the package accepting system according to the present example embodiment differs from the package accepting system according to the second example embodiment in that the shipping charge is calculated by performing the character recognition processing on the information contained in the shipment label affixed to the package P and the payment processing for the shipping charge is performed with the electronic money. An operation example of a package measuring apparatus in the package accepting system according to the present example embodiment (hereinbelow referred to as this system) will be described with reference to FIG. 12.

The self-checkout POS terminal 10a measures the package P placed on the mounting table 12 while controlling the depth sensor 11 through the control unit thereof and outputs the result of the measurement. In this operation example, the weight of the package P is measured in addition to the size of the package P in Step S4 in the operation example shown in FIG. 4 (Step S14). Other procedural steps are the same, that is, Steps S11 to S13 and Steps S15 to S18 described in FIG. 12 are the same as Steps S1 to S3 and Steps S5 to S8 described in FIG. 4, respectively. However, in Step S15, it may be determined that the package P has been detected based on the detection of the weight using the weighing scale 13.

Hereinbelow, the flow of processing from the measurement of the size and the weight of the package P to the payment for the shipping charge in this system will be described by way of an example.

The customer places the package P to which the shipment label is affixed so that the label is located within the image pick-up range in order to read the character information using the camera-equipped depth sensor 11a. That is, the customer places the package P so that the shipment label is affixed to either one of the three faces whose image can be picked-up. Note that the character information contained in the shipment label may be read with a camera different from the depth sensor. In this system, it is possible to acquire information as regards the shipping destination of the package P and the shipping method thereof from the image data picked-up by the camera-equipped depth sensor 11a by performing the character recognition processing on the image data. Note that the information of the shipment origin of the package P (that is, the information of the customer) may be acquired.

In general, the shipping charge of the package is calculated based on the information of the size of the package, the shipping destination (the distance to the shipping destination), and the shipping method. In this system, the size and the weight of the package are measured using the camera-equipped depth sensor 11a and the weighing scale 13, and the shipping destination and the shipping method are read using the camera-equipped depth camera 11a. Further, in this system, the shipping charge of the package may be determined by referring to the tariff pre-stored in the self-checkout POS terminal 10a based on the information read as described above.

The customer then performs the payment processing for the shipping charge through the electronic money R/W 10b connected to the self-checkout POS terminal 10a. In performing the payment processing, the customer may use an IC card or a tablet terminal with an IC card function that belongs to the customer. After the payment processing is performed, a receipt and a slip copy for the store are output from the printer installed at the store, and the customer hands over the package and the slip copy for the store to the store clerk.

While the payment processing is performed with the electronic money in the aforementioned explanation, a cashier including a banknote handling machine and a coin handling machine may be connected to the self-checkout POS terminal so that the payment processing may be performed with cash. Further, both the electronic money R/W and the cashier may be provided.

As described above, in the present example embodiment, the customer can not only measure the size of the package even when a reference label whose size is known is not affixed to the package beforehand like in the first and the second example embodiments but also perform the payment processing for the shipping charge whereby the burden imposed on the store clerk can be reduced. Further, according to the present example embodiment, there is no need to manually enter the shipping destination, the shipping date, and the method of shipment etc. and thus it is possible to prevent error in entering these information.

Further, while the self-checkout POS terminal 10a that is operated by the customer is disposed in the aforementioned description, a self-checkout POS terminal operated by the store clerk may be disposed instead. In such case, the POS terminal may serve as the payment processing apparatus. Further, in this system, an example is given of the case where the weight of the package P is measured using the weighing scale 13 for measuring the weight of the package P, however, in the case where the weight of the package is not relevant in calculating the shipping charge, there is no need to provide the weighing scale 13.

Further, in this system, the size of the package was measured using the self-checkout POS terminal 10a. However, the size of the package P may be measured using the tablet terminal belonging to the customer described in the second example embodiment and the data of the measured size of the package P may be transmitted from the tablet terminal to the self-checkout POS terminal 10a. In order to perform this transmission, the tablet terminal may be configured to be able to establish communication with the depth sensor 11 (and the weighing scale 13) and the self-checkout POS terminal 10a.

Further, the package accepting system according to the present example embodiment may include, in place of the image capturing apparatus, another type of information acquisition apparatus that acquires the shipping information such as a near field communication apparatus. By providing the near field communication apparatus and affixing a readable medium such as an RFID (radio frequency identifier) tag to the package P, the shipping information may be acquired.

Other Example Embodiments

[a]

In the first example embodiment, the function of the control unit 1a of the package measuring apparatus 1 shown in FIG. 1 has been described, however, this function may be realized by any other units of the package measuring apparatus. Like in the first example embodiment, the functions of the functional units 21 to 25 shown in FIG. 3 have been described in the second and the third example embodiments, however these functions may be realized by any other units of the package measuring apparatus.

[b]

Figure 13:
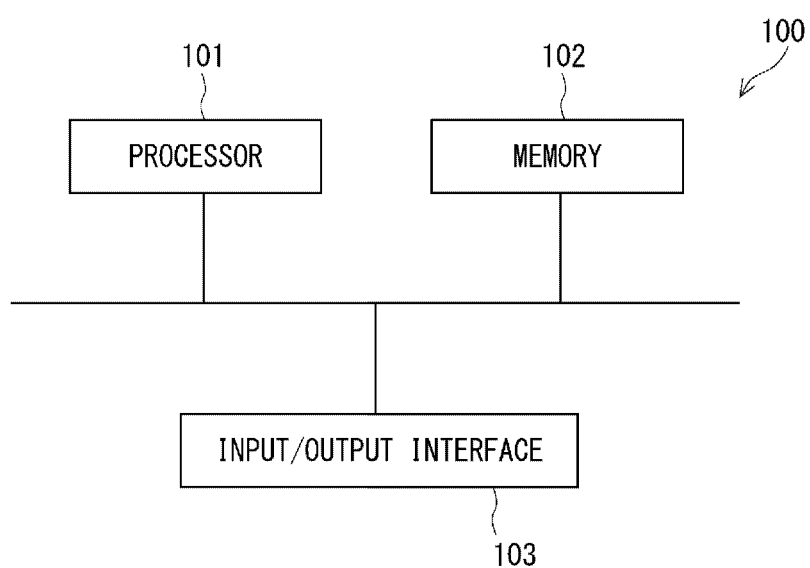
FIG. 13 is a diagram showing an example of a hardware configuration of a package measuring apparatus.

The package measuring apparatus according to the first to the third example embodiments may include a hardware configuration described below. FIG. 13 is a diagram showing an example of a hardware configuration of the package measuring apparatuses according to the first to the third example embodiments. Note that the same applies for the aforementioned other example embodiment [a].

The package measuring apparatus 100 shown in FIG. 13 includes a processor 101, a memory 102, an input/output interface 103 such as a depth sensor 1b (11). The function of the control unit 1a or the functions of the functional units 21 to 25 in the package measuring apparatuses described in the first to the third example embodiments may be implemented by causing the processor 101 to read the program stored in the memory 102. This program may be a program for causing the processor 101 to function as the control unit 1a as described above. Further, this program may include a program for implementing the functions of at least one of the functional units 21 to 25.

In the above-described examples, the program can be stored and provided to a computer using any type of non-transitory computer readable media. Non-transitory computer readable media include any type of tangible storage media. Examples of non-transitory computer readable media include magnetic storage media (e.g., flexible disks, magnetic tapes, and hard disk drives), optical magnetic storage media (e.g., magneto-optical disks). Further, examples of non-transitory computer readable media include CD-ROM (Read Only Memory), CD-R, and CD-R/W. Further, examples of non-transitory computer readable media include semiconductor memories (e.g., mask ROM, PROM (Programmable ROM), EPROM (Erasable PROM), flash ROM, RAM (Random Access Memory).

Further, the program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

[c]

Further, as exemplified in the aforementioned example embodiments, the procedural steps of the package measuring method performed in the package measuring apparatus can be adopted as the method of measuring the size of the package using the aforementioned depth sensor. Further, it can be said that the aforementioned program is a program for causing a computer to perform the aforementioned package measuring method.

Note that the present disclosure is not limited to the aforementioned example embodiments, and can be appropriately changed without departing from the spirit of the present disclosure. Further, the present disclosure may implemented by combining the example embodiments as appropriate.

While the present disclosure has been described with reference to the example embodiments, the present disclosure is not limited to the aforementioned example embodiments. Various modifications that can be understood by those skilled in the art can be made to the configurations and the details of the present disclosure within the scope of the present disclosure.

This application is based upon and claims the benefit of priority from Japanese patent application No. 2018-168783, filed on Sep. 10, 2018, the disclosure of which is incorporated herein in its entirety by reference.

REFERENCE SIGNS LIST 1, 100 PACKAGE MEASURING APPARATUS
1a CONTROL UNIT
1b, 11 DEPTH SENSOR
11a CAMERA-EQUIPPED DEPTH SENSOR
10 TABLET TERMINAL
10a SELF-CHECKOUT POS TERMINAL
10b ELECTRONIC MONEY READER/WRITER (R/W)
12 MOUNTING TABLE
13 WEIGHTING SCALE
21 DEPTH PROCESSING UNIT
22 BACKGROUND DEPTH UNIT
23 VERTEX DETECTION UNIT
24 LENGTH CALCULATION UNIT
25 OUTPUT UNIT
101 PROCESSOR
102 MEMORY
103 INPUT/OUTPUT INTERFACE

What is claimed is:

1. A package measuring apparatus comprising:

a depth sensor disposed at a position at which the depth sensor is able to pick-up an image of a package for three faces thereof simultaneously and configured to acquire a distance to the package by picking-up the image of the package, the package having a rectangular parallelepiped shape and placed on a mounting table; and at least one processor for calculating a size of the package based on data acquired from the depth sensor, wherein the processor performs the processing of:

picking-up an image of the mounting table on which nothing is placed using the depth sensor beforehand and storing the picked-up image as background depth image data;

controlling the depth sensor, acquiring depth image data of the package by picking-up the image of the package placed on the mounting table for the three faces thereof simultaneously using the depth sensor, and specifying data of the package in the depth image data of the package by comparing the depth image data of the package with the background depth image data;

specifying positions of a first vertex, a second vertex, a third vertex, and a fourth vertex, the first vertex being a vertex which is common among the three faces of the package and is at a position closest in distance from the depth sensor within the depth image data of the package, the second vertex being a vertex which is at a position on the leftmost side within the depth image data of the package, the third vertex being a vertex which is at a position on the rightmost side within the depth image data of the package, and the fourth vertex being a vertex which is at a position on the lowermost side within the depth image data of the package;

obtaining spatial coordinates of the first vertex, the second vertex, the third vertex, and the fourth vertex within a space in which the center of the depth sensor is set as the point of origin based on a view angle of the depth sensor; data of a distance from the depth sensor to each of the first vertex, the second vertex, the third vertex, and the fourth vertex, respectively; number of sensor elements of the depth sensor; and data of a position of each sensor element of the depth sensor corresponding to each of the first vertex, the second vertex, the third vertex, and the fourth vertex, respectively; and calculating, based on the spatial coordinates of the first vertex, the second vertex, the third vertex, and the fourth vertex, a length of a first side defined between the first vertex and the second vertex, a length of a second side defined between the first vertex and the third vertex, and a length of a third side defined between the first vertex and the fourth vertex, wherein, when a direction in which the depth sensor picks-up an image is Z-axis, a direction coplanar with the Z-axis and orthogonal to the Z-axis is X-axis, and a direction that is orthogonal to the X-axis and the Z-axis is Y-axis, the processor performs the processing of:

obtaining actual distances from the Z-axis to the image end in the X-axis direction at the first vertex, the second vertex, the third vertex, and the fourth vertex based on a view angle of the depth sensor in the X-axis direction and data of a distance from the depth sensor in the Z-axis direction to each of the first vertex, the second vertex, the third vertex, and the fourth vertex, respectively;

obtaining actual distances from the Z-axis to the image end in the Y-axis direction at the first vertex, the second vertex, the third vertex, and the fourth vertex based on a view angle of the depth sensor in the Y-axis direction and the data of the distance from the depth sensor in the Z-axis direction to each of the first vertex, the second vertex, the third vertex, and the fourth vertex, respectively;

obtaining a change rate of the actual distance in the X-axis direction for each sensor element in the first vertex, the second vertex, the third vertex, and the fourth vertex based on the actual distances from the Z-axis to the image end in the X-axis direction at the first vertex, the second vertex, the third vertex, and the fourth vertex, respectively and number of sensor elements in the X-axis direction of the depth sensor;

obtaining a change rate of the actual distance in the Y-axis direction for each sensor element in the first vertex, the second vertex, the third vertex, and the fourth vertex based on the actual distances from the Z-axis to the image end in the Y-axis direction at the first vertex, the second vertex, the third vertex, and the fourth vertex, respectively and number of sensor elements in the Y-axis direction of the depth sensor; and determining the spatial coordinates of the first vertex, the second vertex, the third vertex, and the fourth vertex by obtaining X coordinates of the first vertex, the second vertex, the third vertex, and the fourth vertex based on the position of each sensor element in the X-axis direction corresponding to each of the first vertex, the second vertex, the third vertex, and the fourth vertex, respectively and the change rate of the actual distance in the X-axis direction for each sensor element in the first vertex, the second vertex, the third vertex, and the fourth vertex, respectively;

obtaining Y coordinates of the first vertex, the second vertex, the third vertex, and the fourth vertex based on the position of each sensor element in the Y-axis direction corresponding to each of the first vertex, the second vertex, the third vertex, and the fourth vertex, respectively and the change rate of the actual distance in the Y-axis direction for each sensor element in the first vertex, the second vertex, the third vertex, and the fourth vertex, respectively; and using data of distances in the Z-axis direction, as Z coordinates, wherein the processor performs the processing of:

based on the data of distance from the depth sensor to the first vertex, obtaining the change rate $\Delta Xa$ of the actual distance in the X-axis direction for each sensor element in the first vertex by equation as follows:

$\Delta Xa = Za \times \tan(\theta x/2)/(Xnmr/2)$, where $Za$ is the Z coordinate of the first vertex, $\theta x$ is the view angle of the depth sensor in the X-axis direction, and $Xnmr$ is the number of sensor elements in the X-axis direction, obtaining the change rate $\Delta Ya$ of the actual distance in the Y-axis direction for each sensor element in the first vertex by equation as follows:

$\Delta Ya = Za \times \tan(\theta y/2)/(Ynmr/2)$, where $\theta y$ is the view angle of the depth sensor in the Y-axis direction and $Ynmr$ is the number of sensor elements in the Y-axis direction, obtaining the X coordinate of the first vertex by equation as follows:

$Xa = \Delta Xa \times ((Xa\text{-pixel}) - Xnmr/2)$, where $Xa$ is the X coordinate of the first vertex and $Xa$-pixel is the position of the sensor element in the X-axis direction corresponding to the first vertex, obtaining the Y coordinate of the first vertex by equation as follows:

$Ya = \Delta Ya \times ((Ya\text{-pixel}) - Ynmr/2)$, where $Ya$ is the Y coordinate of the first vertex and $Ya$-pixel is the position of the sensor element in the Y-axis direction corresponding to the first vertex; and obtaining the X and Y coordinates of the second vertex, the third vertex, and the fourth vertex, similarly.

2. The package measuring apparatus according to claim 1, wherein the processor specifies the first vertex, the second vertex, the third vertex, and the fourth vertex based on the depth image data of the package.

3. The package measuring apparatus according to claim 1, further comprising an image capturing apparatus, wherein the processor specifies the first vertex, the second vertex, the third vertex, and the fourth vertex by performing image recognition of an image acquired by the image capturing apparatus.

4. The package measuring apparatus according to claim 3, further comprising display moans, a display device, wherein the processor causes the image capturing apparatus to capture an image of the package placed on the mounting table and causes the display device to display the captured image, and when at least one of the first to the fourth vertices of the package are not able to be specified, causes the display device to display a message prompting adjustment of a mounting state of the package.

5. The package measuring apparatus according to claim 1, further comprising the mounting table, wherein the depth sensor is attached to the mounting table.

6. The package measuring apparatus according to claim 1, further comprising a weighing scale within the mounting table, wherein the weighing scale is configured to measure a weight of the package and to output a result of the measurement.

7. A package accepting system comprising:
the package measuring apparatus according to claim 1;
an information acquisition apparatus; and
a payment processing apparatus, wherein
the information acquisition apparatus is configured to acquire information related to shipment of the package,
the package measuring apparatus is configured to calculate a shipping charge of the package based on the size of the package and the information related to the shipment of the package, and
the payment processing apparatus is configured to perform payment processing for the shipping charge.

8. A package measuring method for executing calculation processing for calculating a size of a package using a depth sensor disposed at a position at which the depth sensor is able to pick-up an image of a package for three faces thereof simultaneously and configured to acquire a distance to the package by picking-up the image of the package, the package having a rectangular parallelepiped shape and placed on a mounting table, the calculation processing comprising:
picking-up an image of the mounting table on which nothing is placed using the depth sensor beforehand and storing the picked-up image as background depth image data;
controlling the depth sensor, acquiring depth image data of the package by picking-up the image of the package placed on the mounting table for the three faces thereof simultaneously using the depth sensor, and specifying data of the package in the depth image data of the package by comparing the depth image data of the package with the background depth image data;
specifying positions of a first vertex, a second vertex, a third vertex, and a fourth vertex, the first vertex being a vertex which is common among the three faces of the package and is at a position closest in distance from the depth sensor within the depth image data of the package, the second vertex being a vertex which is at a position on the leftmost side within the depth image data of the package, the third vertex being a vertex which is at a position on the rightmost side within the depth image data of the package, and the fourth vertex being a vertex which is at a position on the lowermost side within the depth image data of the package;
obtaining spatial coordinates of the first vertex, the second vertex, the third vertex, and the fourth vertex within a space in which the center of the depth sensor is set as the point of origin based on a view angle of the depth sensor; data of a distance from the depth sensor to each of the first vertex, the second vertex, the third vertex, and the fourth vertex, respectively; number of sensor elements of the depth sensor; and data of a position of each sensor element of the depth sensor corresponding to each of the first vertex, the second vertex, the third vertex, and the fourth vertex, respectively; and
calculating, based on the spatial coordinates of the first vertex, the second vertex, the third vertex, and the fourth vertex, a length of a first side defined between the first vertex and the second vertex, a length of a second side defined between the first vertex and the third vertex, and a length of a third side defined between the first vertex and the fourth vertex,
wherein, when a direction in which the depth sensor picks-up an image is Z-axis, a direction coplanar with the Z-axis and orthogonal to the Z-axis is X-axis, and a direction that is orthogonal to the X-axis and the Z-axis is Y-axis, the calculation processing comprising:
obtaining actual distances from the Z-axis to the image end in the X-axis direction at the first vertex, the second vertex, the third vertex, and the fourth vertex based on a view angle of the depth sensor in the X-axis direction and data of a distance from the depth sensor in the Z-axis direction to each of the first vertex, the second vertex, the third vertex, and the fourth vertex, respectively;
obtaining actual distances from the Z-axis to the image end in the Y-axis direction at the first vertex, the second vertex, the third vertex, and the fourth vertex based on a view angle of the depth sensor in the Y-axis direction and the data of the distance from the depth sensor in the Z-axis direction to each of the first vertex, the second vertex, the third vertex, and the fourth vertex, respectively;
obtaining a change rate of the actual distance in the X-axis direction for each sensor element in the first vertex, the second vertex, the third vertex, and the fourth vertex based on the actual distances from the Z-axis to the image end in the X-axis direction at the first vertex, the second vertex, the third vertex, and the fourth vertex, respectively and number of sensor elements in the X-axis direction of the depth sensor;
obtaining a change rate of the actual distance in the Y-axis direction for each sensor element in the first vertex, the second vertex, the third vertex, and the fourth vertex based on the actual distances from the Z-axis to the image end in the Y-axis direction at the first vertex, the second vertex, the third vertex, and the fourth vertex, respectively and number of sensor elements in the Y-axis direction of the depth sensor; and
determining the spatial coordinates of the first vertex, the second vertex, the third vertex, and the fourth vertex by
obtaining X coordinates of the first vertex, the second vertex, the third vertex, and the fourth vertex based on the position of each sensor element in the X-axis direction corresponding to each of the first vertex, the second vertex, the third vertex, and the fourth vertex, respectively and the change rate of the actual distance in the X-axis direction for each sensor element in the first vertex, the second vertex, the third vertex, and the fourth vertex, respectively;
obtaining Y coordinates of the first vertex, the second vertex, the third vertex, and the fourth vertex based on the position of each sensor element in the Y-axis direction corresponding to each of the first vertex, the second vertex, the third vertex, and the fourth vertex, respectively and the change rate of the actual distance in the Y-axis direction for each sensor element in the first vertex, the second vertex, the third vertex, and the fourth vertex, respectively; and
using data of distances in the Z-axis direction, as Z coordinates,
wherein the calculation processing comprising:
based on the data of distance from the depth sensor to the first vertex,
obtaining the change rate $\Delta Xa$ of the actual distance in the X-axis direction for each sensor element in the first vertex by equation as follows:
$\Delta Xa = Za \times \tan(\theta x/2)/(Xnmr/2)$, where $Za$ is the Z coordinate of the first vertex, $\theta x$ is the view angle of the depth sensor in the X-axis direction, and $Xnmr$ is the number of sensor elements in the X-axis direction, obtaining the change rate ΔYa of the actual distance in the Y-axis direction for each sensor element in the first vertex by equation as follows:
ΔYa=Za×tan (θy/2)/(Ynmr/2), where θy is the view angle of the depth sensor in the Y-axis direction and Ynmr is the number of sensor elements in the Y-axis direction,
obtaining the X coordinate of the first vertex by equation as follows:
Xa=ΔXa×((Xa−pixel)−Xnmr/2), where Xa is the X coordinate of the first vertex and Xa−pixel is the position of the sensor element in the X-axis direction corresponding to the first vertex,
obtaining the Y coordinate of the first vertex by equation as follows:
Ya=ΔYa×((Ya−pixel)−Ynmr/2), where Ya is the Y coordinate of the first vertex and Ya−pixel is the position of the sensor element in the Y-axis direction corresponding to the first vertex; and
obtaining the X and Y coordinates of the second vertex, the third vertex, and the fourth vertex, similarly.

9. A non-transitory computer readable medium storing a program for causing a computer to perform calculation processing of calculating a size of a package using a depth sensor disposed at a position at which the depth sensor is able to pick-up an image of a package for three faces thereof simultaneously and configured to acquire a distance to the package by picking-up the image of the package, the package having a rectangular parallelepiped shape and placed on a mounting table, the calculation processing comprising:
picking-up an image of the mounting table on which nothing is placed using the depth sensor beforehand and storing the picked-up image as background depth image data;
controlling the depth sensor, acquiring depth image data of the package by picking-up the image of the package placed on the mounting table for the three faces thereof simultaneously using the depth sensor, and specifying data of the package in the depth image data of the package by comparing the depth image data of the package with the background depth image data;
specifying positions of a first vertex, a second vertex, a third vertex, and a fourth vertex, the first vertex being a vertex which is common among the three faces of the package and is at a position closest in distance from the depth sensor within the depth image data of the package, the second vertex being a vertex which is at a position on the leftmost side within the depth image data of the package, the third vertex being a vertex which is at a position on the rightmost side within the depth image data of the package, and the fourth vertex being a vertex which is at a position on the lowermost side within the depth image data of the package;
obtaining spatial coordinates of the first vertex, the second vertex, the third vertex, and the fourth vertex within a space in which the center of the depth sensor is set as the point of origin based on a view angle of the depth sensor; data of a distance from the depth sensor to each of the first vertex, the second vertex, the third vertex, and the fourth vertex, respectively; number of sensor elements of the depth sensor; and data of a position of each sensor element of the depth sensor corresponding to each of the first vertex, the second vertex, the third vertex, and the fourth vertex, respectively; and
calculating, based on the spatial coordinates of the first vertex, the second vertex, the third vertex, and the fourth vertex, a length of a first side defined between the first vertex and the second vertex, a length of a second side defined between the first vertex and the third vertex, and a length of a third side defined between the first vertex and the fourth vertex,
wherein, when a direction in which the depth sensor picks-up an image is Z-axis, a direction coplanar with the Z-axis and orthogonal to the Z-axis is X-axis, and a direction that is orthogonal to the X-axis and the Z-axis is Y-axis, the calculation processing comprising:
obtaining actual distances from the Z-axis to the image end in the X-axis direction at the first vertex, the second vertex, the third vertex, and the fourth vertex based on a view angle of the depth sensor in the X-axis direction and data of a distance from the depth sensor in the Z-axis direction to each of the first vertex, the second vertex, the third vertex, and the fourth vertex, respectively;
obtaining actual distances from the Z-axis to the image end in the Y-axis direction at the first vertex, the second vertex, the third vertex, and the fourth vertex based on a view angle of the depth sensor in the Y-axis direction and the data of the distance from the depth sensor in the Z-axis direction to each of the first vertex, the second vertex, the third vertex, and the fourth vertex, respectively;
obtaining a change rate of the actual distance in the X-axis direction for each sensor element in the first vertex, the second vertex, the third vertex, and the fourth vertex based on the actual distances from the Z-axis to the image end in the X-axis direction at the first vertex, the second vertex, the third vertex, and the fourth vertex, respectively and number of sensor elements in the X-axis direction of the depth sensor;
obtaining a change rate of the actual distance in the Y-axis direction for each sensor element in the first vertex, the second vertex, the third vertex, and the fourth vertex based on the actual distances from the Z-axis to the image end in the Y-axis direction at the first vertex, the second vertex, the third vertex, and the fourth vertex, respectively and number of sensor elements in the Y-axis direction of the depth sensor; and
determining the spatial coordinates of the first vertex, the second vertex, the third vertex, and the fourth vertex by
obtaining X coordinates of the first vertex, the second vertex, the third vertex, and the fourth vertex based on the position of each sensor element in the X-axis direction corresponding to each of the first vertex, the second vertex, the third vertex, and the fourth vertex, respectively and the change rate of the actual distance in the X-axis direction for each sensor element in the first vertex, the second vertex, the third vertex, and the fourth vertex, respectively;
obtaining Y coordinates of the first vertex, the second vertex, the third vertex, and the fourth vertex based on the position of each sensor element in the Y-axis direction corresponding to each of the first vertex, the second vertex, the third vertex, and the fourth vertex, respectively and the change rate of the actual distance in the Y-axis direction for each sensor element in the first vertex, the second vertex, the third vertex, and the fourth vertex, respectively; and
using data of distances in the Z-axis direction, as Z coordinates,
wherein the calculation processing comprising:
based on the data of distance from the depth sensor to the first vertex, obtaining the change rate $\Delta Xa$ of the actual distance in the X-axis direction for each sensor element in the first vertex by equation as follows:

$\Delta Xa = Za \times \tan(\theta x/2)/(Xnmr/2)$, where $Za$ is the Z coordinate of the first vertex, $\theta x$ is the view angle of the depth sensor in the X-axis direction, and $Xnmr$ is the number of sensor elements in the X-axis direction, obtaining the change rate $\Delta Ya$ of the actual distance in the Y-axis direction for each sensor element in the first vertex by equation as follows:

$\Delta Ya = Za \times \tan(\theta y/2)/(Ynmr/2)$, where $\theta y$ is the view angle of the depth sensor in the Y-axis direction and $Ynmr$ is the number of sensor elements in the Y-axis direction, obtaining the X coordinate of the first vertex by equation as follows:

$Xa = \Delta Xa \times ((Xa\text{-pixel}) - Xnmr/2)$, where $Xa$ is the X coordinate of the first vertex and $Xa\text{-pixel}$ is the position of the sensor element in the X-axis direction corresponding to the first vertex, obtaining the Y coordinate of the first vertex by equation as follows:

$Ya = \Delta Ya \times ((Ya\text{-pixel}) - Ynmr/2)$, where $Ya$ is the Y coordinate of the first vertex and $Ya\text{-pixel}$ is the position of the sensor element in the Y-axis direction corresponding to the first vertex; and obtaining the X and Y coordinates of the second vertex, the third vertex, and the fourth vertex, similarly.

\* \* \* \* \*